United States Patent
Takahashi et al.

(10) Patent No.: US 7,644,701 B2
(45) Date of Patent: Jan. 12, 2010

(54) FUEL INJECTION CONTROL APPARATUS AND METHOD IN INTERNAL COMBUSTION ENGINE

(75) Inventors: Yoshiyuki Takahashi, Kariya (JP); Yuji Narita, Kariya (JP); Hisanobu Suzuki, Toyota (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 113 days.

(21) Appl. No.: 11/895,599

(22) Filed: Aug. 24, 2007

(65) Prior Publication Data
US 2008/0047528 A1    Feb. 28, 2008

(30) Foreign Application Priority Data
Aug. 25, 2006    (JP)    ............................. 2006-229046

(51) Int. Cl.
F02M 51/00    (2006.01)
F02M 7/00    (2006.01)
(52) U.S. Cl. ..................................... 123/473; 123/436
(58) Field of Classification Search ................. 123/473, 123/436, 446; 701/102, 104; 702/96, 151
See application file for complete search history.

(56) References Cited

U.S. PATENT DOCUMENTS 4,757,795 A * 7/1988 Kelly .......................... 123/506
4,814,704 A    3/1989 Zerrien, Jr. et al.
5,041,979 A * 8/1991 Hirka et al. .................. 701/102
5,429,093 A * 7/1995 Fukui et al. ............. 123/406.58
6,229,302 B1    5/2001 Varady et al.

FOREIGN PATENT DOCUMENTS

| DE | 19722316 | 12/1998 |
| JP | 07-174773 | 7/1995 |
| JP | 2002-303199 | 10/2002 |
| WO | WO 2005/052345 A1 | 6/2005 |

OTHER PUBLICATIONS

International Search Report dated Mar. 1, 2005 issued by European Patent Office for application No. PCT/EP2004/052922.
European Search Report dated Nov. 19, 2007 issued by European Patent Office for application No. 07114976.9-2311.

* cited by examiner

*Primary Examiner*—Mahmoud Gimie
(74) *Attorney, Agent, or Firm*—Locke Lord Bissell & Liddell LLP

(57) ABSTRACT

A preset waiting period is previously set on the basis of a signal in correspondence to a detection of a start point of a detection of a no-tooth portion of a signal rotor. In the case of a control for injecting a fuel after the preset waiting period has elapsed, an output of a signal indicating a start point of an actual detection of the no-tooth portion by a waveform shaping portion is delayed due to the existence of the no-tooth portion. A control computer corrects the preset waiting period to be shorter by an amount corresponding the delay. Accordingly, an accuracy of a fuel injection start timing control is improved.

9 Claims, 4 Drawing Sheets

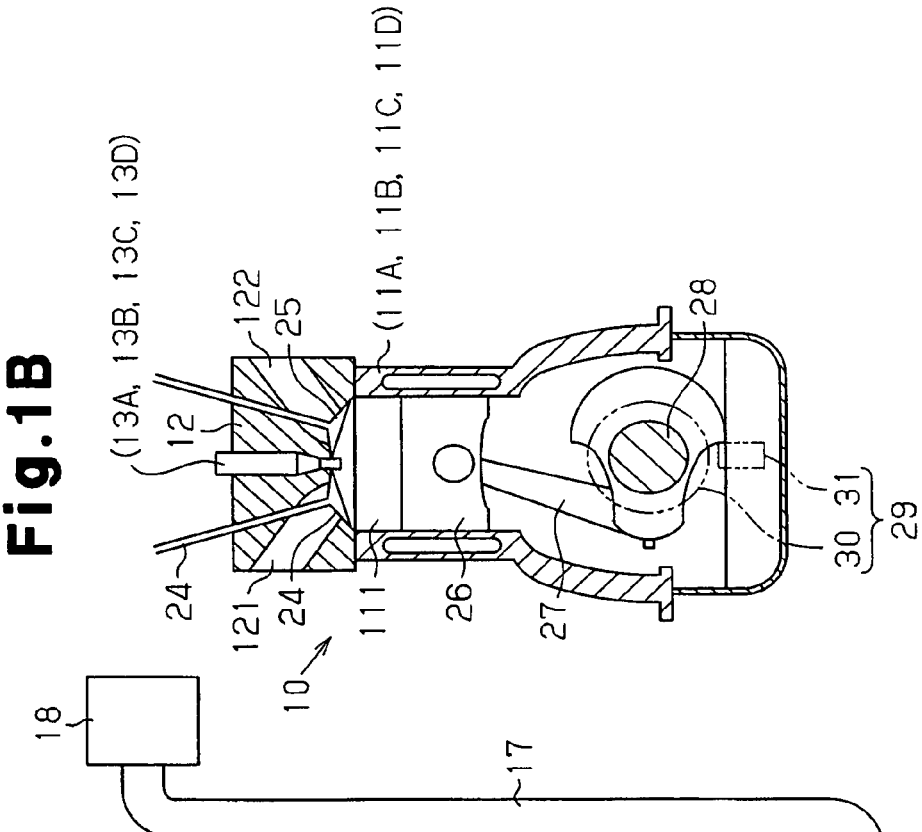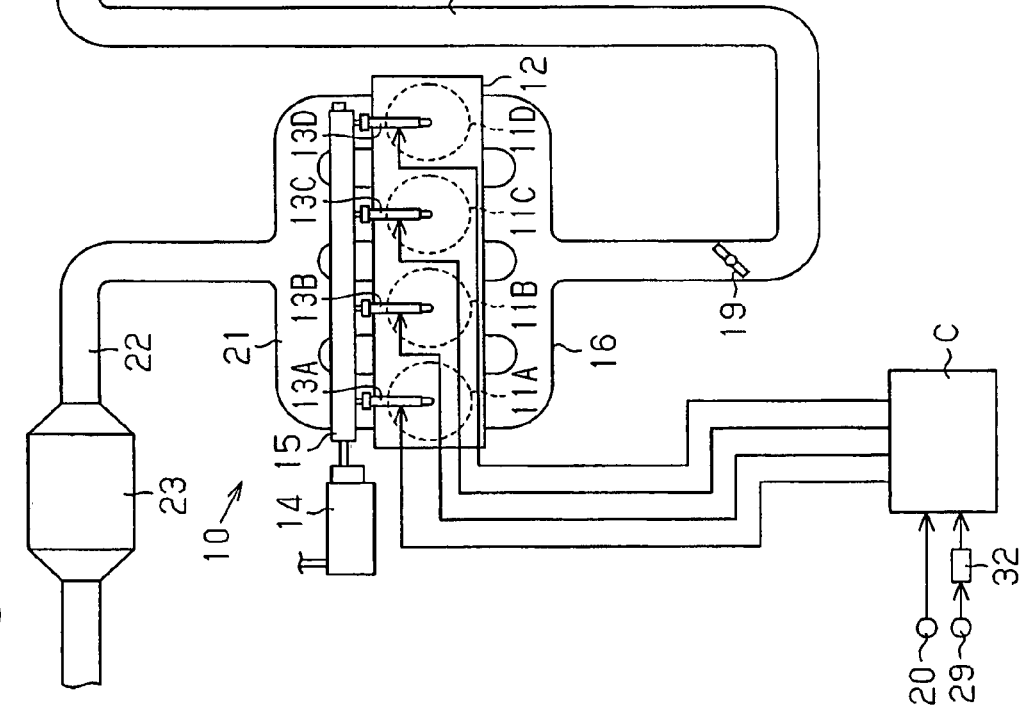

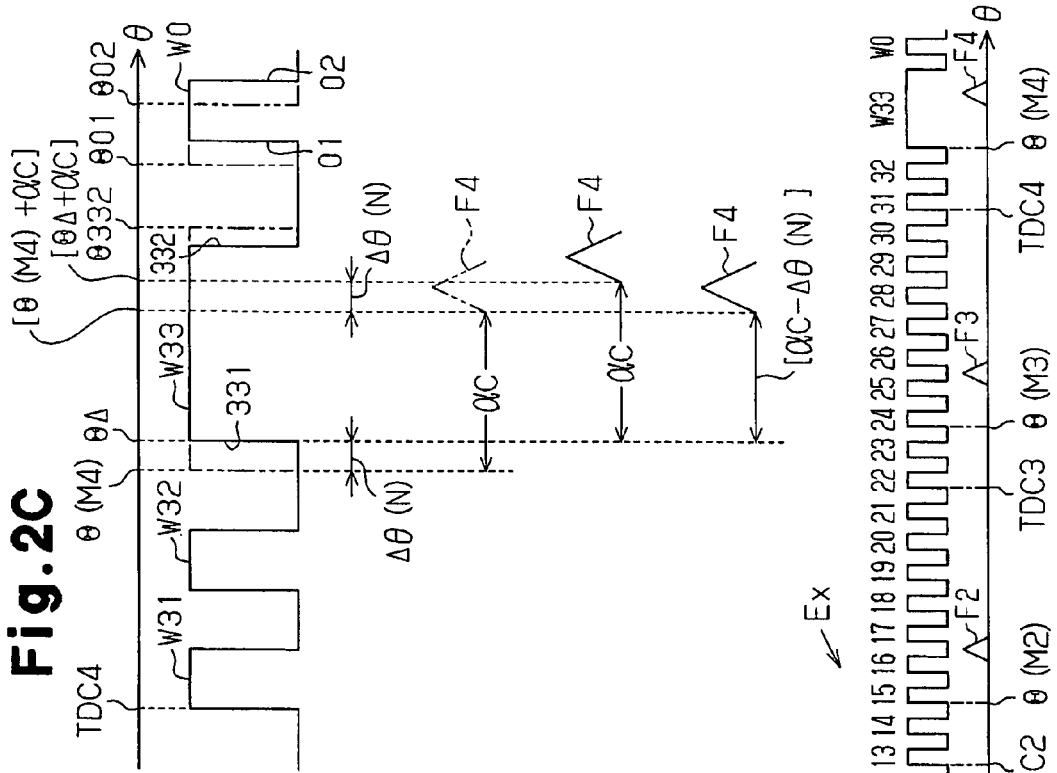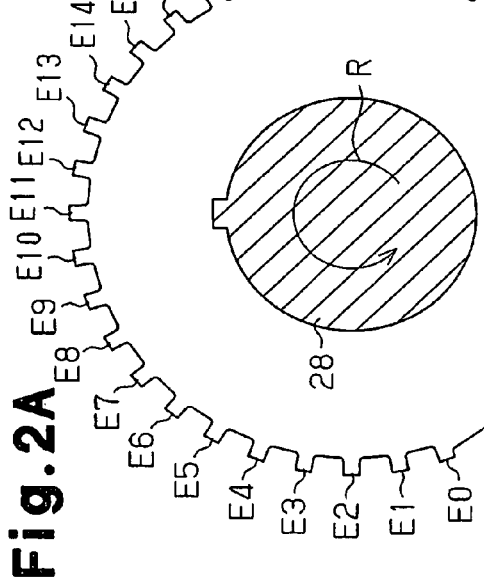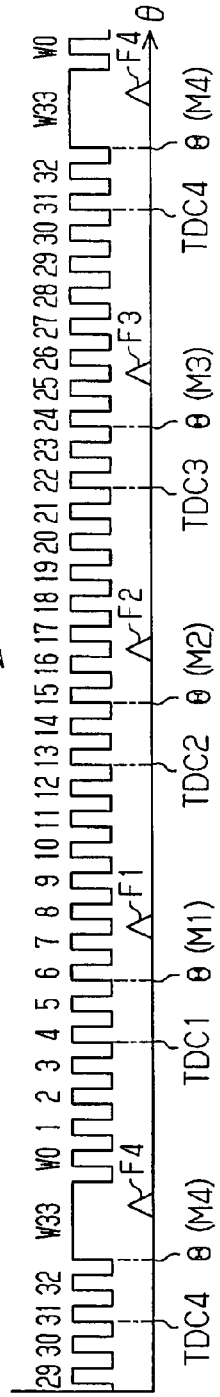

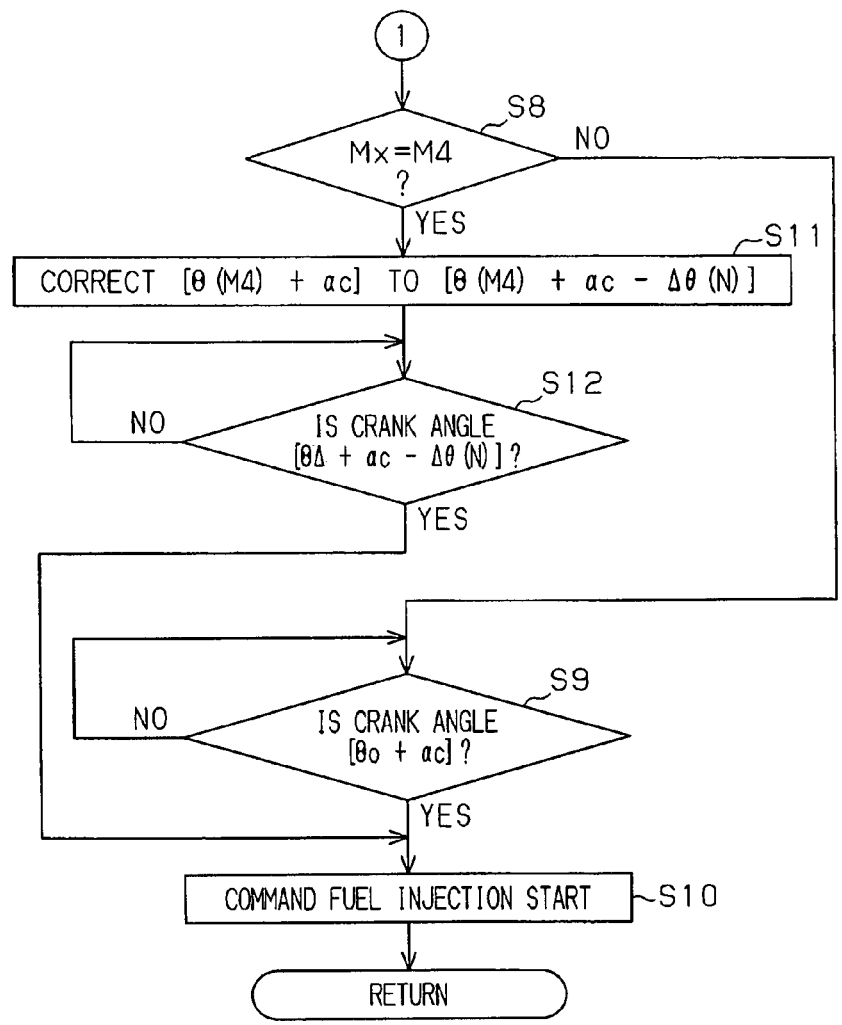

FUEL INJECTION CONTROL APPARATUS AND METHOD IN INTERNAL COMBUSTION ENGINE

BACKGROUND OF THE INVENTION

The present invention relates to a fuel injection control apparatus and a control method in an internal combustion engine. The control apparatus is provided with a fuel injection portion and a control portion. The fuel injection portion injects a fuel which is burned in a cylinder of the internal combustion engine. The control portion controls injection start timing for injecting fuel from the fuel injection portion.

Japanese Laid-Open Patent Publication Nos. 7-174773 and 2002-303199 each discloses a crank angle sensor detecting a crank angle of an internal combustion engine. A toothed rotor made of a magnetic material, that is, a signal rotor is attached to a crankshaft. The crank angle-sensor includes a magnet pickup coil.

The signal rotor has a plurality of teeth provided in an outer periphery at a uniform interval. A part of the outer periphery is provided with no teeth. A reference position of the crank angle is detected by utilizing such the no-tooth portion of the signal rotor.

The shape of the no-tooth portion is different from the shape of the tooth portion. Accordingly, a rising portion of a rectangular wave obtained by shaping the waveform of an output signal at a time of detecting the no-tooth portion is delayed from a rising portion of a rectangular wave obtained by shaping the waveform of an output signal at a time of detecting a normal tooth portion. The control disclosed in Japanese Laid-Open Patent Publication No. 7-174773 accurately determines an instantaneous rotational speed by correcting the delay (deviation) mentioned above.

In order to increase an engine output and an exhaust performance, it is necessary to inject fuel at a proper timing. However, neither of the above publications discloses an idea for injecting the fuel at a proper timing while taking the deviation accompanying the detection of the no-tooth portion.

SUMMARY OF THE INVENTION

Accordingly, it is an objective of the present invention to improve a control accuracy in the case of controlling a fuel injection start timing by using a signal rotor having a no-tooth portion.

In accordance with one aspect of the present invention, a fuel injection control apparatus in an internal combustion engine is provided. The engine has cylinders, fuel injection portions, and a signal rotor. The fuel injection portion injects fuel to be burned in the cylinders. The signal rotor has a no-tooth portion and a plurality of tooth portions. The tooth portions include a following tooth portion that is arranged adjacent to and follows the no-tooth portion. A signal output portion outputs signals in correspondence to respective detections of the tooth portion and the no-tooth portion. A control portion controls the fuel injection portions in such a manner as to inject the fuel after a preset waiting period has elapsed. The preset waiting period is previously set on the basis of the signal. A time point at which the signal output portion actually outputs a signal showing start point or an end point of the detection of the no-tooth portion or a start point or an end point of the detection of the following tooth portion is deviated by the existence of the no-tooth portion. In the case that the control portion controls the fuel injection portion in such a manner as to inject the fuel after a preset waiting period, which has been previously set on the basis of the signal corresponding to the detection of the start point or the end point has elapsed, the correcting portion corrects the preset waiting period by an amount corresponding to of the deviation.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1A is a schematic view of an internal combustion engine controlled by an embodiment according to one embodiment of the present invention;

FIG. 1B is a side cross-sectional view of the engine in FIG. 1A;

FIG. 2A is an enlarged view showing the signal rotor and the pickup coil shown in FIG. 1B;

FIG. 2B is a timing chart showing a waveform Ex detected from the signal rotor shown in FIG. 2A;

FIG. 2C is an enlarged view of a main portion of the waveform Ex in FIG. 2B;

FIG. 4 is a flowchart continued from FIG. 3; and

FIG. 5 is a map used in the program of FIG. 4.

DETAILED DESCRIPTION OF PREFERABLE EMBODIMENTS

Figure 3:
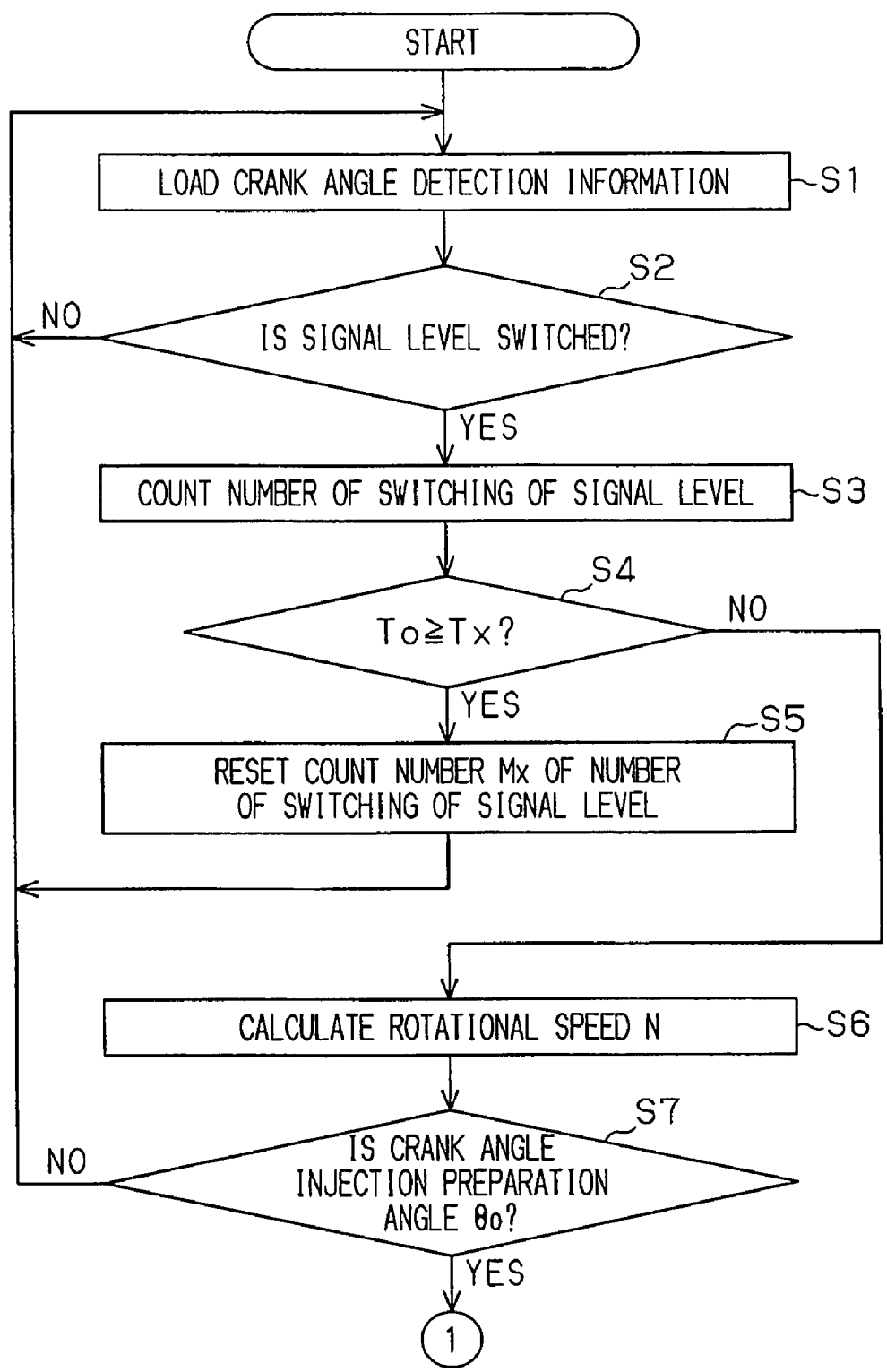
FIG. 3 is a flowchart showing a fuel injection control program executed by the control computer shown in FIG. 2A.

FIGS. 1A to 5 show one embodiment according to the present invention.

FIG. 1A shows a diesel engine 10 corresponding to an internal combustion engine in accordance with the embodiment. The diesel engine 10 is a four-stroke engine provided with four cylinders 11A, 11B, 11C, and 11D. Fuel injection nozzles 13A, 13B, 13C, and 13D are attached to the cylinder head 12 with respect to cylinders 11A, 11B, 11C, and 11D. Fuel is supplied to the fuel injection nozzles 13A, 13B, 13C, and 13D via a fuel pump 14 and a common rail 15. The fuel injection nozzles 13A, 13B, 13C, and 13D inject the fuel into the respective cylinders 11A, 11B, 11C, and 11D. The fuel pump 14, the common rail 15, and the fuel injection nozzles 13A, 13B, 13C, and 13D constitute a fuel injection portion. The fuel injection portion injects the fuel to be burned within a plurality of cylinders of the internal combustion engine.

An intake manifold 16 is connected to the cylinder head 12. The intake manifold 16 is connected to an intake passage 17. The intake passage 17 is connected to an air cleaner 18. A throttle valve 19 is provided in the middle of the intake passage 17. The throttle valve 19 regulates a flow rate of an air drawn into the intake passage 17 via the air cleaner 18. An opening degree of the throttle valve 19 is regulated in accordance with an operation of an accelerator pedal (not shown). A pedal depression angle of the accelerator pedal is detected by an accelerator pedal position sensor 20.

An exhaust manifold 21 is connected to the cylinder head 12. The exhaust manifold 21 is connected to an exhaust passage 22. An exhaust purification apparatus 23 (for example, a NOx catalyst) is located in the exhaust passage 22. Exhaust gas discharged from the cylinders 11A, 11B, 11C, and 11D is discharged to the atmospheric air via the exhaust manifold 21, the exhaust passage 22, and the exhaust purification apparatus 23.

As shown in FIG. 1B, intake ports 121 and exhaust ports 122 are formed in the cylinder head 12. Each of the intake ports 121 has a first end connected to a combustion chamber 111 within each of the cylinders 11A, 11B, 11C, and 11D, and a second end connected to a branch pipe in the intake manifold 16. Each of the exhaust ports 122 has a first end connected to the combustion chamber 111, and a second end connected to a branch pipe of the exhaust manifold 21.

The intake port 121 is opened and closed by an intake valve 24. The exhaust port 122 is opened and closed by an exhaust valve 25. A piston 26 defining the combustion chamber 111 within each of the cylinders 11A, 11B, 11C, and 11D is coupled to a crankshaft 28 via a connecting rod 27. A reciprocating motion of the piston 26 is converted into a rotating, motion of the crankshaft 28 via the connecting rod 27. A crank angle detector 29 detects a rotation angle of the crankshaft 28, that is, a crank angle.

As shown in FIG. 2A, the crank angle detector 29 includes a-signal rotor 30 fixed to the crankshaft 28, and an electromagnetic induction type pickup coil 31. The signal rotor 30 is rotated in a direction of arrow R integrally with the crankshaft 28. A plurality of tooth portions E0, E1, E2, ... E31 and E32 are arranged alphabetically in a peripheral edge of the signal 30. Further, a no-tooth portion E33 is provided in a peripheral edge of the signal rotor 30. The no-tooth portion E33 is positioned between the tooth portion E0 and the tooth portion E32. As shown in FIG. 2A, the following tooth portion E0 is adjacent so as to follow the no-tooth portion E33 with respect to the rotating direction R of the signal rotor 30. The pickup coil 31 outputs a voltage signal in accordance with the rotation of the signal rotor 30. A voltage signal output from the pickup coil 31 is sent to a waveform shaping portion 32. The waveform shaping portion 32 shapes the voltage signal sent from the pickup coil 31 in a pulse-shaped waveform so as to output to a control computer C. The pickup coil 31 and the waveform shaping portion 32 constitute a signal output portion. The signal output portion outputs a signal in correspondence to a detection of the tooth portions E0 to E32 and the no-tooth portion E33.

The waveform Ex exemplified in FIG. 2B shows a pulse-shaped waveform output from the waveform shaping portion 32 at a time when the signal rotor 30 executes one or more rotations. A horizontal axis θ indicates a crank angle. TDC1 indicates a crank angle at a time when the piston 26 in the cylinder 11A exists at a top dead center position. TDC2 indicates a crank angle at a time when the piston 26 in the cylinder 11B exists at a top dead center position. TDC3 indicates a crank angle at a time when the piston 26 in the cylinder 11C exists at a top dead center position. TDC4 indicates a crank angle at a time when the piston 26 in the cylinder 11D exists at a top dead center position. A no-tooth waveform W33 corresponding to the detection of the no-tooth portion E33 shows a waveform of a partial pulse shape of the waveform Ex. The waveforms W0 to W32 of the other pulse shape of the waveform Ex are waveforms corresponding to the detection of the tooth portions E0, E1, E2, ..., E31 and E32.

Reference symbol F1 denotes a period of the fuel injection from the fuel injection nozzle 13A in the cylinder 11A. Reference symbol F2 denotes a period of the fuel injection from the fuel injection nozzle 13B in the cylinder 11B. Reference symbol F3 denotes a period of the fuel injection from the fuel injection nozzle 13C in the cylinder 11C. Reference symbol F4 denotes a period of the fuel injection from the fuel injection nozzle 13D in the cylinder 11D. A crank angle $\Theta(M1)$ corresponds to a rising of the waveform W6 obtained by detecting the tooth portion E6. Start of the fuel injection period F1 is set after a predetermined time $\alpha(N)$ from the detection of the crank angle $\Theta(M1)$. The time $\alpha(N)$ is a time set while taking a rotational speed N of the signal rotor 30, that is, an engine rotational speed into consideration. If the time $\alpha(N)$ is displayed as the crank angle, it has a fixed angle interval $\alpha c$.

A crank angle $\Theta(M2)$ corresponds to a rising portion of the waveform W15 obtained by detecting the tooth portion E15. A start of the fuel injection period F2 is set after a predetermined time $\alpha(N)$ from the detection of the crank angle $\Theta(M2)$, that is, after $\alpha c$ in the case of being displayed by the crank angle. A crank angle $\Theta(M3)$ corresponds to a rising portion of the waveform W24 obtained by detecting the tooth portion E24. A start of the fuel injection period F3 is set after a predetermined time $\alpha(N)$ from the detection of the crank angle $\Theta(M3)$, that is, after $\alpha c$ in the case of being displayed by the crank angle. A crank angle $\Theta(M4)$ corresponds to a rising portion of the no-tooth waveform W33 obtained by detecting the no-tooth portion E33. A start of the fuel injection period F4 is set after a predetermined time $\alpha(N)$ from the detection of the crank angle $\Theta(M4)$, that is, after $\alpha c$ in the case of being displayed by the crank angle.

A pedal depression angle detection information obtained by the accelerator pedal position sensor 20, and a crank angle detection information obtained by the crank angle detector 29 are sent to the control computer C. The crank angle detection information corresponds to a voltage signal shown by a waveform Ex. The control computer C calculates the fuel injection periods (the injection start timing and the injection end timing) in the fuel injection nozzles 13A, 13B, 13C, and 13D on the basis of the pedal depression angle detection information and the crank angle detection information.

FIGS. 3 and 4 are flowcharts showing a fuel injection control program. A description will be given below of a fuel injection control in accordance with the flowcharts.

As shown in FIG. 3, the crank angle detection information (the waveform Ex) is loaded into the control computer C per predetermined control cycle unit (step S1). The control computer C determines whether a signal level of the crank angle detection information is switched from a low level to a high level (step S2). In the case that the signal level is not switched from the low level to the high level (NO on step S2), the control computer C proceeds to step S1.

In the case that the signal level is switched from the low level to the high level (YES on step S2), the control computer C counts the number of switching of the signal level, and acquires a count number Mx (step S3). The control computer C comprehends the crank angle on the basis of the count number Mx. After the process of step S3, the control computer C compares a width To of the current detection pulse with a predetermined interval Tx in magnitude (step S4). The "predetermined interval Tx" is, for example, three-fold the width of the pulse signal obtained at a time of detecting the teeth portion at the previous time. The control computer C comprehends the width of the detection pulse by measuring a time interval from a rising portion to a falling portion of the detection pulse.

In the case of To$\geq$Tx (YES on step S4), that is, in the case of detecting the no-tooth portion E33, the control computer C resets the count number Mx (step S5), and proceeds to step S1.

In the case of To<Tx (NO on step S4), the control computer C calculates a rotational speed N of the signal rotor 30, that is, an engine rotational speed on the basis of a time difference between the previous switching timing of the signal level and this time switching timing (step S6).

After the process of step S6, the control computer C determines whether the crank angle is a previously set injection preparation angle Θo (step S7). The injection preparation angle Θo is one of the crank angles Θ(M1), Θ(M2), Θ(M3) and Θ(M4). Reference symbols M1, M2, M3, and M4 respectively denote the numbers of waves counted from the detection of the no-tooth portion E33 to the switching portion of the signal level from the low level to the high level in the crank angles Θ(M1), Θ(M2), Θ(M3) and Θ(M4). In other words, reference symbols M1, M2, M3, and M4 respectively denote the number of waves counted from the detection of the no-tooth portion E33 to the rising portion of the waveform corresponding to the crank angles Θ(M1), Θ(M2), Θ(M3) and Θ(M4) among the rising position of the waveforms W0 to W32, W33. M1, M2, M3, and M4 are respectively constituted by integers, and a relation M1<M2<M3<M4 is established. In the case shown in FIG. 2B, a relation M1=7, M2=16, M3=25 and M4=34 is established. In the case that the crank angle is not the injection preparation angle Θo (NO in step S7), the control computer C proceeds to step S1.

In the case that the crank angle is the injection preparation angle Θo (YES on step S7), the control computer C determines whether the count number Mx is an integer M4 as shown in FIG. 4 (step S8). In the case that the count number Mx is not the integer M4 (NO on step S8), the control computer C waits in a state in which the computer can determine whether the time α(N) has elapsed from the detection timing of the injection preparation angle Θo (step S9). In other words, the control computer C waits in a state in which the control computer C can determine whether the crank angle comes to (Θo+αc). In this case, Θo indicates one of Θ(M1), Θ(M2) and Θ(M3). If the crank angle comes to (Θo+αc), the control computer C commands a start of the fuel injection with the fuel injection nozzle (any one of the fuel injection nozzles 13A, 13B, and 13C) (step S10). In other words, the control computer C commands the start of the fuel injection at the crank angle (Θo+αc) and proceeds to step S1. As a result, the fuel injection nozzle (any one of the fuel injection nozzles 13A, 13B, and 13C) to inject the fuel at the crank angle (Θo+αc) starts the fuel injection. The angle interval [Θo, (Θo+αc)] is a preset waiting period serving as a preset injection waiting period which is previously set on the basis of Θo.

A preset waiting period [Θ(M4), (Θ(M4)+αc)] is set on the basis of the starting point Θ4 of the previous detection of the no-tooth portion E33. In other words, it is set on the basis of the preset waiting period [Θ4, (Θ(M4)+αc)] and the rising portion 331 of the no-tooth waveform W33. In other words, the preset waiting period [Θ(M4), (Θ(M4)+αc)] can be expressed by an angle corresponding to "one rotation (360°) of the engine 10+predetermined angle interval (αc)".

In the case that the count number Mx is the integer M4 (YES in step S8), the control computer C corrects [Θ(M4)+αc)] to [Θ(M4)+αc−Δθ(N)] (step S11). As shown in FIG. 2C, ΘΔ indicates a crank angle of the rising portion of the detection pulse detected after the rising Θ(M4) of the no-tooth portion E33. In other words, in step S11, the control computer C corrects αc to (αc−Δθ(N)). As a result, the end point [Θ(M4)+αc+Δθ(N)]] of the preset waiting period [ΘM4, (Θ(M4)+αc) is corrected to [Θ(M4)+αc]. In other words, the actual end point [ΘΔ+αc] is corrected to [ΘΔ+αc−Δθ(N)]. The correction amount Δθ(N) is an estimation value of a delay from the rising Θ(M4) of the no-tooth portion E33 to ΘΔ. In other words, ΘΔ is equal to [Θ(M4)+Δθ(N)]. In other words, the correction amount Δθ(N) indicates a shift between Θ(M4) and ΘΔ. The correction amount Δθ(N) corresponds to an angle set while taking the rotational speed N into consideration. The correction amount Δθ(N) is an experimental value which is previously determined through experiments.

The correction amount Δθ(N) is determined on the basis of a measured value Δt(N) of a time interval from the injection preparation angle Θ(M4) to the rising portion 331, and the rotational speed N. Table in FIG. 5 indicates a map MP of the measured value Δt(N). Hereinafter, the measured value Δt(N) is described as a correction amount Δt(N). A correction amount Δt(1) indicates a time interval at a time when the rotational speed N is 1000 rpm. A correction amount Δt(2) indicates a time interval at a time when the rotational speed N is 2000 rpm, a correction amount Δt(3) indicates a time interval at a time when the rotational speed N is 3000 rpm, and a correction amount Δt(4) indicates a time interval at a time when the rotational speed N is 4000 rpm. Expressing by the crank angle, the correction amount Δt(1) is, for example, 1°, the correction amount Δt(2) is, for example, 2°, the correction amount Δt(3) is, for example, 3°, and the correction amount Δt(4) is, for example, 4°. In other words, the control computer C in step S11 reads the correction amount Δt(N) corresponding to the rotational speed N from the map MP, and corrects [Θ(M4)+αc] to [Θ(M4)+αc−Δθ(N)].

The injection preparation angle Θ(M4) is assumed to be detected in the crank angle shown by a chain line in FIG. 2C. However, the crank angle ΘΔ of the rising portion 331 (shown by a solid line in FIG. 2C) of the no-tooth waveform W33 is actually detected. In other words, the injection waiting period corresponding to the fuel injection period F4 may actually comes to [ΘΔ, ΘΔ+αc] which is deviated by δ(N) from [Θ(M4), Θ(M4)+αc]. The deviation δ(N) corresponds to a value obtained by converting Δθ(N) into time. The deviation δ(N) corresponds to a time interval between the injection preparation angle Θ(M4) and the crank angle ΘΔ of the rising portion 331. The deviation δ(N) mentioned above is generated on the basis of the existence of the no-tooth portion E33. Hereinafter, [ΘΔ, ΘΔ+αc] is described as "delay injection waiting period" or "deviation injection waiting period". The deviation δ(N) mentioned above is not generated in the injection preparation angle Θ(M1), Θ(M2) and Θ(M3) which are far from the no-tooth portion E33.

A magnitude of the deviation δ(N) depends on the rotational speed N. The magnitude of the deviation δ(N) is previously determined in accordance with experiments. The correction amount Δt(N) in the map MP in FIG. 5 corresponds to the deviation δ(N).

As mentioned above, the delay injection waiting period [ΘΔ, ΘΔ+αc] is deviated from the preset waiting period [Θ(M4), Θ(M4)+αc] due to the existence of the no-tooth portion E33. The end point (ΘΔ+αc) is [Θ(M4)+αc+Δθ(N)]. The control computer on step S11 corrects [Θ(M4), Θ(M4)+αc] to [Θ(M4), Θ(M4)+αc−Δθ(N)] so as to correct the end point (ΘΔ+αc) of the delay injection waiting period [ΘΔ, ΘΔ+αc] to [Θ(M4)+Δc]. In other words, the preset waiting period [Θ(M4), Θ(M4)+αc] is corrected to become shorter by an amount corresponding to delay Δθ(N). In other words, the preset waiting period [Θ(M4), Θ(M4)+αc] is corrected by an amount of the deviation (Δθ(N)). In other words, αc is corrected to [αc−Δθ(N)]. This is equivalent to correcting [ΘΔ, ΘΔ+αc] to [ΘΔ, ΘΔ+αc−Δθ(N)].

After the process of step S11, the control computer C waits in a state in which the control computer C can determine whether the crank angle comes to [ΘΔ+αc−ΔΘ(N)] (step S12). In other words, the crank angle is determined whether it comes to [Θ(M4)+αc]. In other words, on the basis of the time measurement result whether the time [Δ(N)−Δt(N)] has elapsed from the detecting timing of the crank angle ΘΔ, the crank angle is determined whether it comes to [ΘΔ+αc−Δθ(N)]. In the case that the crank angle comes to [ΘΔ+αc−Δθ(N)], that is, [Θ(M4)+αc] (YES on step s12), the control computer C commands the fuel injection start of the fuel injection nozzle 13D (step S10), and proceeds to step S1. As a result, the fuel injection nozzle 13D starts the fuel injection at the crank angle [Θ(M4)+αc].

The control computer C corresponds to a control portion (C) serving as an injection control portion. The control portion (C) determines the fuel injection start timing from the fuel injection portion (13A to 13D) on the basis of the signal output from the signal output portion (31, 32) and the previously preset waiting period. Further, the control computer C corresponds to a correction portion. The preset waiting period [Θ(M4), Θ(M4)+αc] is deviated due to the existence of the no-tooth portion E33, and comes to the delay injection waiting period [ΘΔ, ΘΔ+αc]. The correction portion (C) corrects the preset waiting period [Θ(M4), Θ(M4)+αc] so as to correct the end point (ΘΔ+αc) of the delay injection waiting period [ΘΔ, ΘΔ+αc]. The pickup coil 31, the waveform shaping portion 32 and the control computer C constitute the rotational speed detecting portion detecting the rotational speed of the signal rotor 30.

The present embodiment has the following advantages.

(1) In the case that the preset waiting period [Θ(M4), Θ(M4)+αc] is deviated, the control computer C corrects the end point [Θ(M4)+αc] of the preset waiting period [Θ(M4), Θ(M4)+αc] so as to cancel the deviation Δθ(N). Accordingly, the fuel injection is started at a desired injection start timing [Θ(M4)+αc]. In other words, the control accuracy is improved in the case of controlling the fuel injection start timing by using the signal rotor 30 having the no-tooth portion E33.

(2) The preset waiting period [Θ(M4), Θ(M4)+αc] is set on the basis of the starting point ΘΔ (the rising portion 331 of the no-tooth waveform W33) of the previous detection of the no-tooth portion E33. In other words, the period from the time point at which the rising portion of the waveform of the pulse shape after the starting point em is detected at M4 times (=34 times) to the period by angle αc later is set as the preset waiting period [Θ(M4), Θ(M4)+αc]. In other words, the preset waiting period [Θ(M4), Θ(M4)+αc] corresponds to the period from the time point after one turn of the signal rotor 30 from the previous detection start point em of the no-tooth portion E33 to the period by predetermined angle αc later. In other words, showing the preset waiting period [Θ(M4), Θ(M4)+αc] set in correspondence to the fuel injection period F4 by angle, it is "one rotation (360°) of the engine 10+predetermined angle interval".

For example, in the case of the control of starting the fuel injection just after the detection of the no-tooth portion E33, there is a risk that the control corresponding to the detection of the no-tooth portion E33 is too late. However, since the control of the present embodiment starts the fuel injection after one turn of the signal rotor 30 after detecting the no-tooth portion E33, there is no risk that the control is too late.

(3) The more the rotational speed (the engine rotational speed) of the signal rotor 30 is increased, the more the deviation δ(N) is increased. The correction amount Δt(N) corresponding to the deviation δ(N) is selected in correspondence to the detection value of the rotational speed N of the signal rotor 30. Accordingly, the fuel injection start timing control on the basis of the detection of the no-tooth portion E33 is executed at a high accuracy even in the internal combustion engine in which the rotational speed N is changed.

(4) A unit of the preset waiting period [Θ4, (Θ4+αc)] used for the injection start timing control by the control computer C is time, and a unit of the correction amount Δt(N) is also time. The time in this case is a discontinuous time such as a time interval of the control cycle. However, the control cycle can be made very short. In the present embodiment, since the unit of the preset waiting period [Θ4, (Θ4+αc)] and the unit of the correction amount Δt(N) are both time, it is possible to execute the correction control at a high accuracy.

The present invention may be modified as follows.

FIG. 2C shows a following waveform W0 corresponding to the waveform detecting the following tooth portion E0. The preset waiting period in which a rising portion 01 of the following waveform W0 is set as the starting point may be corrected by the present invention. The rising portion of the waveform detecting the following tooth portion E0 is assumed to be detected at a crank angle Θ01 (shown by a chain line in FIG. 2C). However, the actual rising portion 01 (shown by a solid line in FIG. 2C) can be detected by an angle position which is delayed from the crank angle Θ01. In other words, the output (the waveform W0) of the signal obtained by detecting the following tooth portion E0 tends to be deviated. However, in accordance with the present invention, the preset waiting period is set on the basis of the detection of the no-tooth portion E33 prior to the detection just before the no-tooth portion E33, that is, on the basis of the detection of the previous detection of the no-tooth portion E33.

As shown in FIG. 2C, the preset waiting period in which a falling portion 02 of the following waveform W0 is set as the starting point may be corrected by the present invention. The falling portion of the waveform detecting the following tooth portion E0 is assumed to be detected at a crank angle Θ02 (shown by a chain line in FIG. 2C). However, the actual falling portion 02 (shown by a solid line in FIG. 2C) can be detected by an angle position which is delayed from the crank angle Θ02.

FIG. 2C shows a falling portion 332 of the no-tooth waveform W33 detecting the no-tooth portion E33. The preset waiting period in which the falling portion 332 is set as the starting point may be corrected by the present invention. The falling portion of the waveform detecting the no-tooth portion E33 is assumed to be detected in a crank angle Θ332 (shown by a chain line in FIG. 2C). However, the actual rising portion 01 (shown by a solid line in FIG. 2C) can be detected by an angle position which is advancer than the crank angle Θ332.

For example, Θ(M4) is assumed to show the falling portion 332 of the no-tooth waveform W33. In this case, the control computer C in step S11 corrects the preset waiting period [Θ(M4), Θ(M4)+αc] to become longer by amount corresponding to the advance ΔΘ(N). In other words, the preset waiting period [Θ(M4), Θ(M4)+αc] is corrected at the amount of the deviation (Δθ(N)). In other words, αc is corrected to [αc+Δθ(N)]. This is equivalent to correcting [ΘΔ, ΘΔ+αc] to [ΘΔ, ΘΔ+αc+Δθ(N)].

The angle αc may be different for respective cylinders 11A, 11B, 11C, and 11D.

The invention claimed is:

1. A fuel injection control apparatus in an internal combustion engine, the engine having cylinders, fuel injection portions, and a signal rotor, the fuel injection portions inject fuel to be burned in the cylinders, the signal rotor having a no-tooth portion and a plurality of tooth portions, and the tooth portions including a following tooth portion that is arranged adjacent to and follows the no-tooth portion, the control apparatus comprising:

a signal output portion outputting signals in correspondence to respective detections of the tooth portions and the no-tooth portion;

a control portion controlling the fuel injection portions in such a manner as to inject the fuel after a preset waiting period has elapsed, the preset waiting period being previously set on the basis of the signal, and wherein a lime point, at which the signal output portion actually outputs a signal indicating a start point or an end point of a detection of the no-tooth portion or a start point or an end point of the detection of the following tooth portion, is deviated due to the existence of the no-tooth portion; and a correcting portion that corrects the preset waiting period by an amount corresponding to the deviation in the case that the control portion controls the fuel injection portion in such a manner as to inject the fuel after a preset waiting period, which has been previously set on the basis of the signal corresponding to the detection of the start point or the end point has elapsed.

2. The control apparatus according to claim 1, wherein the time point at which the signal output portion actually outputs the signal indicating the start point of the detection of the no-tooth portion or the start point or the end point of the detection of the following toot portion is delayed due to the existence of the no-tooth portion, and wherein the correcting portion corrects the preset waiting period to be shorter by an amount corresponding to the delay.

3. The control apparatus according to claim 1, wherein the time point at which the signal output portion actually outputs the signal indicating the end point of the detection of the no-tooth portion is advanced due to the existence of the no-tooth portion, and wherein the correcting portion corrects the preset waiting period to be longer by an amount corresponding to the advance.

4. The control apparatus according to claim 1, wherein the preset waiting period is corrected on the basis of the signal output from the signal output portion at a time point when the engine 10 turns by 360° from the detection of the no-tooth portion.

5. The control apparatus according to claim 4, wherein the preset waiting period is set on the basis of the start point or the end point of the detection of the following tooth portion.

6. The control apparatus according to claim 1, further comprising a rotational speed detecting portion detecting a rotational speed of the signal rotor, wherein the correcting portion determines a correction amount of the preset waiting period in correspondence to the rotational speed.

7. The control apparatus according to claim 6, wherein the unit of the preset waiting period and the unit of the correction amount are both time.

8. The control apparatus according to claim 6, wherein the value of the correction amount is previously determined through experiments.

9. A fuel injection control method in an internal combustion engine, the control method comprising the steps of:

detecting respectively a plurality of tooth portions and a no-tooth portion provided in a signal rotor of the engine so as to output signals, the signal rotor rotating in accordance with rotation of the engine, and the tooth portions including a following tooth portion that is arranged adjacent to and follows the no-tooth portion;

controlling to inject fuel to cylinders after a preset waiting period has elapsed, the preset waiting period being previously set on the basis of the signal, and wherein an output of a signal indicating a start point or an end point of an actual detection of the no-tooth portion or a start point or an end point of an actual detection of the following toot portion is deviated due to the existence of the no-tooth portion, in the case of injecting the fuel after an elapse of a preset waiting period, which is previously set on the basis of a signal in correspondence to a detection of a start point or an end point of the detection of the no-tooth portion or a start point or an end point of a detection of the following tooth portion; and correcting the preset waiting period by an amount corresponding to the deviation.

* * * * *